Feb. 6, 1962  L. G. ROLLINS  3,019,665
UNIVERSAL PIVOTED LINK CHAIN
Filed Dec. 19, 1957
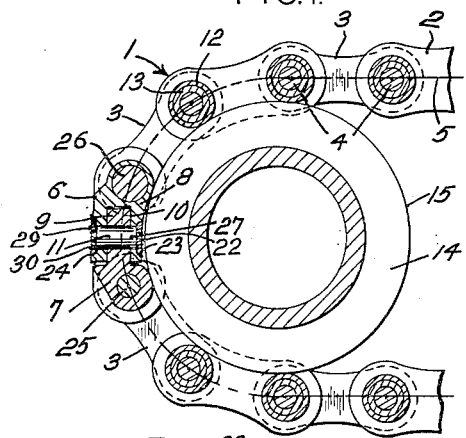
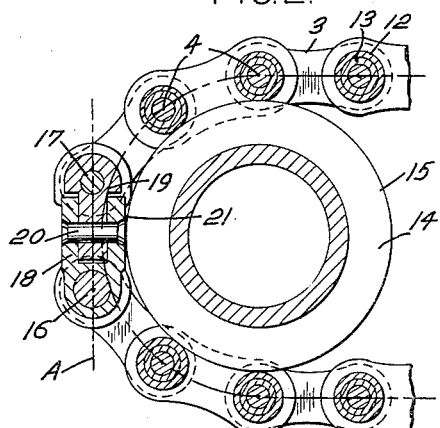
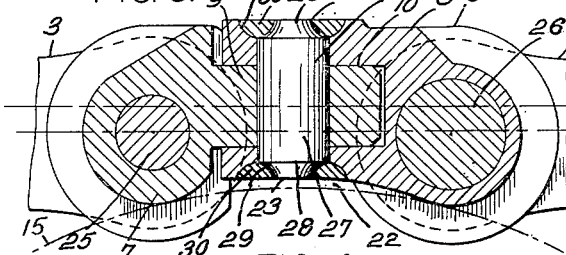
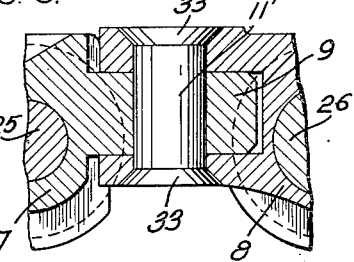
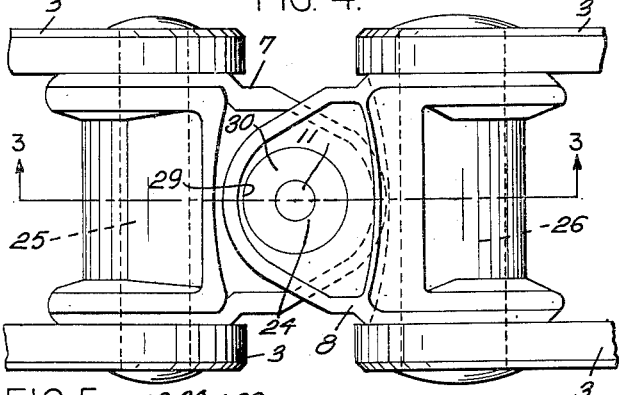
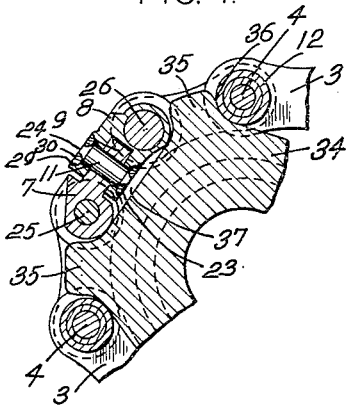
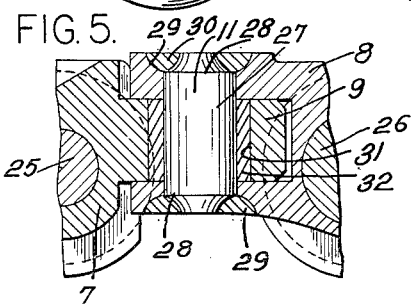
*INVENTOR.*
LESTER G. ROLLINS.
BY
ATTORNEY.

United States Patent Office 3,019,665
Patented Feb. 6, 1962

3,019,665
UNIVERSAL PIVOTED LINK CHAIN
Lester G. Rollins, Franklin, Pa., assignor to Joy Manufacturing Company, Pittsburgh, Pa., a corporation of Pennsylvania
Filed Dec. 19, 1957, Ser. No. 703,873
5 Claims. (Cl. 74—246)

This invention relates to pivoted link chains and more particularly to a pivoted link chain of the universal type adapted to flex in angularly related planes.

Heretofore, in universal pivoted link chains, the link elements of certain links of the chain usually were formed with tongue and groove connections bisected by a line in which the axes of the pivot pins at the pitch line of the chain lie, with the pivot pins of said certain links extending perpendicularly to the pivot pins at the pitch line. In chains of such a known design, the thickened portions of the mentioned links as they passed around rotary guides or sprockets caused the pitch line of the chain to be deflected outwardly resulting in a chain which was relatively uneven in motion at the guide or sprocket, setting up vibrations and stresses which substantially increased undue wear and breakage and resulting in a chain which is relatively noisy in operation. The present invention contemplates improvements over universal pivoted link chains of known types in that the pivoted tongue and groove portions of certain of the universal links are offset outwardly from the pitch line of the chain, thereby providing sufficient clearance at the inner sides of the links without decreasing their strength so that the chain passes relatively smoothly about the guides or sprockets resulting in a universal chain which has longer life and is relatively quiet in operation.

An object of the present invention is to provide an improved universal pivoted link chain. Another object is to provide an improved universal pivoted link chain wherein certain of the universal links have interfitting tongue and groove portions arranged in a novel manner whereby while strength is maintained smoothness in operation and longer chain life results. A further object is to provide an improved universal pivoted link chain wherein certain of the universal links have right angular pivots offset outwardly from the pitch line of the chain to provide a rugged structure having substantial clearance at the inner sides of the links so that the chain may pass relatively smoothly and quietly about its rotary guides or sprockets. These and other objects and advantages of the invention will, however, hereinafter more fully appear in the course of the ensuing description.

In the accompanying drawings there are shown for purposes of illustration one form and modifications thereof which the invention may assume in practice.

In the drawings:

FIG. 1 is a detail sectional view taken through a universal pivoted link chain constructed in accordance with a preferred illustrative embodiment of the invention.

FIG. 2 is a view similar to FIG. 1 showing a universal chain of a known type.

FIG. 3 is a longitudinal vertical section taken on line 3—3 of FIG. 4.

FIG. 4 is a top plan view of a section if the improved chain.

FIGS. 5 and 6 are fragmentary sectional views taken on the plane of FIG. 3 illustrating modified constructions.

FIG. 7 is a fragmentary sectional view similar to FIG. 1, showing the improved chain in guided relation with a chain sprocket.

The universal conveyor chain, generally designated 1, generally comprises series of chain links 2 pivotally connected to outer strap links 3 by transverse hinge or pivot pins 4 arranged with their axes lying in planes at the pitch line 5 of the chain. Spaced at intervals along the length of the chain between certain of the strap links 3, are other links 6 comprising link elements 7 and 8. Each link element 7 has a tongue 9 fitted within a groove 10 in the cooperating link element 8 and the tongue and groove portions are pivotally connected by a pivot pin 11 arranged with its axis perpendicular to a line parallel with the connecting pins 4. The chain is herein, for illustrative purposes, shown as being of the roller type having rollers 12 journaled on bushings 13 surrounding the hinge pins 4 and, as the chain passes around a rotary guide 14, the rollers move around the circular periphery 15 of the guide. Evidently, the chain may be constructed in other manners.

In FIG. 2, a universal pivoted link chain of a known type is shown and in this known construction a plane A in which the axes of the transverse pivot pins 16 and 17 lie bisects the link elements 18 and 19 midway between the ends of the pivot pin 20 so that as these link elements pass around the rotary guide the inner surfaces 21 engaging the guide-periphery 15 force the link elements outwardly from the pitch line of the chain, thereby resulting in a chain which is relatively uneven in motion and setting up vibrations and stresses tending to drive out the pivot pins 20 and which substantially increase chain wear and breakage, resulting in a chain which is relatively noisy in operation.

In accordance with the present invention, the tongue and groove connections between the chain elements 7 and 8 and the pivot pin 11 are offset outwardly a substantial distance from the pitch line of the chain, thereby providing at 22 substantial clearance at the inner sides 23 of the links so that these links pass smoothly around the rotary guides as the chain is circulated in its orbit. In FIG. 3, the inner clearance 22 is clearly shown with the inner sides of these chain links substantially closer to the pitch line 5 of the chain than are the outer sides 24 of the chain links. In FIG. 3, a plane B parallel with the pitch line 5 which bisects the chain parts 7 and 8 is spaced a substantial distance outwardly from the pitch line, and cuts through the pivot pin 11 intermediate the ends of the pin.

In FIG. 4, the link elements which are pivotally connected by the perpendicular pivot pins 11 are shown pivotally connected to the outer strap links 3 by means of transverse pivot pins 25 and 26 respectively, the latter herein desirably being substantially larger in cross section than the former. The perpendicular pivot pins 11 are provided with cylindrical bodies 27 formed with reduced end portions 28, and the opposite sides of the link elements 8 are annularly recessed at 29 coaxially with the pins. The annular spaces formed between the outer walls of the recesses and the reduced portions of the pivot pins are filled with welding material at 30 so that the end portions of the pivot pins 11 are integrally welded to the link elements 8.

In the modification shown in FIG. 5, the tongue portion 9 of the link element 7 is formed with an enlarged bore 31 and, surrounding the hinge pin 11 and fitted within this bore, is a wear bushing 32. In the modification shown in FIG. 6, the pivot pin 11' is in the form of a rivet having peened ends 33 in lieu of the welded ends of the forms above described.

In FIG. 7, the improved universal pivoted link chain is shown passing around and engaging a rotary drive sprocket 34 with the teeth 35 of the sprocket projecting between the chain links and drivingly engaging at 36 one of the guide rollers 12 of the chain. The substantial clearance spaces 37 between the inner surfaces 23 of the universal chain links and the sprocket-periphery, as clearly shown in FIG. 7, enable the chain to pass relatively freely about the drive sprocket without outward deflection of the universal links from the pitch line of the chain. Also cutting away of the sprocket body between the teeth, as necessary in a chain of the type shown in FIG. 2, is avoided.

As a result of this invention, an improved universal pivoted link chain is provided having improved pivoted link structures whereby the chain may pass relatively smoothly about its rotary guides or sprockets. The provision of the link pivots of certain of the universal links spaced a substantial distance outwardly from the pitch line of the chain results in a chain which passes relatively smoothly about its guide, thereby eliminating the vibrations and stresses set up by universal chains of known types. The pivot pins between the tongue and groove connections of certain of the universal chain links are so spaced outwardly from the pitch line of the chain that without decreasing link strength substantial clearances are provided at the inner side of the chain links which provide for relatively smooth operation of the chain. The chain is not only relatively smooth and quiet in operation, but is also relatively simple and rugged in design, well adapted to meet the demands of service. Other advantages of the invention will be clearly apparent to those skilled in the art.

While there are in this application specifically described one form and modifications thereof which the invention may assume in practice, it will be understood that this form and modifications of the same are shown for purposes of illustration and that the invention may be further modified and embodied in various other forms without departing from its spirit or the scope of the appended claims.

What I claim is new and desire to secure by Letters Patent is:

1. In a universal pivoted link chain, a series of link elements pivotally connected by transverse pivot pins arranged with their axes lying at the pitch line of the chain, and other link elements spaced at intervals along the length of the chain intermediate said first mentioned link elements, said last mentioned link elements having pivot pins arranged perpendicularly to lines parallel with said transverse pivot pins, said perpendicularly arranged pivot pins spaced with their axes at right angle to the line parallel with the transverse pivot pin axes with the inner sides of said last mentioned link elements closer to the pitch line of the chain than are the outer surfaces of said last mentioned link elements thereby to provide for substantial clearance spaces at the inner sides of said last mentioned link elements.

2. A universal pivoted link chain as set forth in claim 1 wherein said last mentioned link elements have interfitting tongue and groove portions pivotally connected by said perpendicularly arranged pivot pins, with the tongues and grooves bisected by planes offset outwardly from planes in which the axes of said transverse pivot pins lie.

3. In a universal pivoted link chain having an inner side adapted to be engaged by a sprocket, a series of chain links pivotally connected by transverse hinge pins and additional links intermediate certain of said first mentioned links, each of said additional links comprising link parts being pivotally connected together at one end and at their other ends engaging transverse hinge pins respectively and said link parts having their inner side disposed substantially closer to the pitch line of the chain than their outer side.

4. In a universal pivoted link chain, a series of link elements pivotally connected by transverse pivot pins the axes of which define the pitch line of the chain, said series of link elements presenting an outer surface and an inner surface, at least one of said link elements having another pivot pin arranged with its axis substantially perpendicular to said pitch line and to the transverse pivot pins adjacent thereto, said one link presenting an outer surface and an inner surface and wherein the inner surface of all said links lies on one side of said pitch line and said inner surface of said one link element being closer to said pitch line than said outer surface of said one link element to provide a clearance space on said inner surface of said one link element.

5. In a universal pivoted link chain, a series of link elements pivotally connected by transverse pivot pins the axes of which define the pitch line of the chain, said series of link elements presenting an outer surface and an inner surface, at least one of said link elements having another pivot pin arranged with its axis substantially perpendicular to said pitch line and to the transverse pivot pins adjacent thereto, said one link presenting an outer surface and an inner surface and wherein the inner surface of all said links lies on one side of said pitch line, said inner surface of said one link element being closer to said pitch line than said inner surface of said remaining link elements to provide a clearance space on said inner surface of said one link element and said outer surface of said one link element lying further outward from said pitch line than said outer surface of said remaining link elements.

References Cited in the file of this patent
UNITED STATES PATENTS

| | | |
|---|---|---|
| 2,319,979 | Collins et al. | May 25, 1943 |
| 2,460,447 | Clarkson | Feb. 1, 1949 |
| 2,463,970 | Hunnicutt | Mar. 8, 1949 |